US006522969B2

(12) United States Patent
Kannonji

(10) Patent No.: US 6,522,969 B2
(45) Date of Patent: Feb. 18, 2003

(54) FOLLOWING DISTANCE DISPLAYING APPARATUS THAT CHANGES ALARMING DISPLAY ACCORDING TO OPERATING STATES

(76) Inventor: Michihiro Kannonji, 4-16, Sunamichi-cho 2-cho, Sakai-shi, Osaka (JP)

(*) Notice: Subject to any disclaimer, the term of this patent is extended or adjusted under 35 U.S.C. 154(b) by 0 days.

(21) Appl. No.: 09/987,254

(22) Filed: Nov. 14, 2001

(65) Prior Publication Data

US 2002/0062189 A1 May 23, 2002

(30) Foreign Application Priority Data

Nov. 22, 2000 (JP) ....................................... 2000-399361

(51) Int. Cl.[7] .......................... B60K 31/00; G01S 13/93
(52) U.S. Cl. .......................... 701/96; 701/301; 340/435
(58) Field of Search ............................ 701/93, 96, 300, 701/301, 302; 180/167; 340/435, 436; 342/70

(56) References Cited

U.S. PATENT DOCUMENTS 5,515,448 A * 5/1996 Nishitani .................... 382/106
5,699,149 A * 12/1997 Kuroda et al. ............. 356/4.01
5,754,099 A * 5/1998 Nishimura et al. ......... 340/435
6,119,068 A 9/2000 Kannonji ..................... 701/301
6,366,845 B1 * 4/2002 Kannonji ..................... 701/96

* cited by examiner

*Primary Examiner*—Yonel Beaulieu
(74) *Attorney, Agent, or Firm*—McDermott, Will & Emery

(57) ABSTRACT

The following distance alarming apparatus includes a memory responsive to an output signal value of a sensor, which changes in accordance with a driver's operation for speed adjustment of a subject vehicle, having remained unchanged for a prescribed time period, for storing a reference value for the output signal value of the sensor, and an alarming circuit determining a possibility of collision of the subject vehicle with a preceding vehicle, based on a following distance measured by a following distance measuring device when the output signal value from the sensor remained unchanged for the prescribed time period, the output signal value from the sensor and the reference value stored in the memory, and outputting a warning sound.

28 Claims, 8 Drawing Sheets

FOLLOWING DISTANCE DISPLAYING APPARATUS THAT CHANGES ALARMING DISPLAY ACCORDING TO OPERATING STATES

CROSS-REFERENCE TO RELATED APPLICATION

This application is related to copending application Ser. No. 09/670,517, filed Sep. 26, 2000, and issued as U.S. Pat. No. 6,366,845 B1.

BACKGROUND OF THE INVENTION

1. Field of the Invention

The present invention relates to a following distance alarming apparatus for preventing collision of a vehicle equipped with the following distance alarming apparatus (hereinafter, simply referred to as "subject vehicle") against a vehicle running ahead (hereinafter, simply referred to as "preceding vehicle") based on a measurement of a distance from the subject vehicle to the preceding vehicle or based on an output signal of a sensor working with an apparatus controlling the speed of the subject vehicle, and a displaying apparatus for displaying operating states of the following distance alarming apparatus or a change of the following distance.

2. Description of Related Art

Vehicles such as automobiles move independently from each other on a road. Therefore, there might occur an accident such as bumping of vehicles. On a superhighway, in particular, the frequency of rear-end collisions is higher and a high vehicle speed is liable to invite serious results.

The major cause of collision is a following distance that is too short. Under these circumstances, apparatuses have been conventionally proposed for preventing a collision accident between a subject vehicle and a preceding vehicle by using a following distance measuring device. The applicant of the present invention also proposed following distance informing apparatuses for informing a driver of a change of the following distance in the U.S. patent application Ser. No. 08/998,017, filed on Dec. 24, 1997, for which a patent has been granted as U.S. Pat. No. 6,119,068, and in the U.S. patent application Ser. No. 09/670,517, filed on Sep. 26, 2000.

In a state where a plurality of vehicles are driving safely, each driver repeats a series of operations against every change in the following distance to prevent (rear-end) collision and others. For example, if the following distance from the subject vehicle to the preceding vehicle becomes small, a driver of the subject vehicle would ease up on the accelerator pedal or depress the brake pedal to reduce the speed of the subject vehicle. It is considered that failure or delay in the series of such operations contributes to the (rear-end) collision.

The related art described above advantageously allows a driver to readily cope with a change of following distance by informing the driver of the change. The related art, however, has a problem that, when the following distance changes every moment, it is difficult for the driver to instinctively apprehend the change. In particular, a reliable apparatus has not become widespread to date which can prevent rear-end collision and others by accurately detecting failure or delay of the series of operations by a driver due to inattentive driving or the like.

SUMMARY OF THE INVENTION

Based on the foregoing, an object of the present invention is to provide a novel, following distance alarming apparatus which checks, when the subject vehicle approaches the preceding vehicle, a driver's reaction to the decrease of the following distance, based on a change of output signal value of a sensor that generates a signal in accordance with an operation of an accelerator pedal or the like, and generates a warning sound when there is a possibility of collision to prevent an accident from occurring.

Another object of the present invention is directed to improvement of a conventional following distance alarming apparatus, and is to provide a following distance alarming apparatus which accurately responds to the following distance changing every moment.

Yet another object of the present invention is to provide each of the above-described apparatuses with an optimal displaying apparatus, so as to provide a following distance alarming apparatus which allows operating states of the apparatus to be apprehended at a glance and is improved in practicability and reliability as a guide to safe driving.

The following distance alarming apparatus according to an aspect of the present invention for achieving the above objects is a following distance alarming apparatus that is connected to receive output signals of a following distance measuring device and a sensor having an output signal value that changes in accordance with a driver's operation for speed adjustment of a subject vehicle. The apparatus includes a memory connectable to receive the output signal value from the sensor and, when the output signal value from the sensor remained unchanged for a prescribed time period, storing a reference value for the output signal value of the sensor based on the output signal value from the sensor, and a first alarming circuit connectable to receive the output signal values from the sensor and the following distance measuring device and further connected to the memory, and determining a possibility of collision of the subject vehicle with a preceding vehicle, based on the following distance measured by the following distance measuring device when the output signal value from the sensor remained unchanged for the prescribed time period, the output signal value from the sensor and the reference value stored in the memory, to output a warning sound.

The following distance alarming apparatus according to another aspect of the present invention is connected to receive output signals of a following distance measuring device and a sensor having an output signal value that changes in accordance with a driver's operation for speed adjustment of a subject vehicle. The apparatus includes a memory connectable to receive the output signal of the following distance measuring device and, when it is detected that the subject vehicle and a preceding vehicle maintained a follow-up travel state for a prescribed time period based on a following distance measured by the following distance measuring device, storing a reference value determined based on the output signal value from the sensor at that time, a first alarming circuit connectable to receive the output signals of the sensor and the following distance measuring device and further connected to the memory, and, when the following distance measured by the following distance measuring device coincided with an alarm distance determined corresponding to the following distance at the time of the follow-up travel state, determining a possibility of collision of the subject vehicle with a preceding vehicle based on the output signal value from the sensor and the reference value stored in the memory, to output a warning sound, a circuit for, when it is detected that the subject vehicle and a preceding vehicle have maintained a follow-up travel state for a prescribed time period again, causing the memory to store a reference value determined based upon the output value of the sensor, and a second alarming circuit, responsive to the output signal value from the sensor having satisfied a prescribed relation with the reference value and responsive to the following distance measuring device having measured the alarm distance determined corresponding to the following distance at the time of the follow-up travel state, for determining the possibility of collision of the subject vehicle with the preceding vehicle based on the output signal value from the sensor and the reference value stored in the memory, to output the alarm.

The following distance alarming apparatus according to a further aspect of the present invention includes an alarm unit outputting a warning sound, based on a following distance measurement signal, when a following distance between a subject vehicle and a preceding vehicle is reduced to a prescribed value, a detecting unit detecting that an output signal from a sensor having an output signal value changing in accordance with a driver's operation for control of a speed of the subject vehicle has remained unchanged for a prescribed time period, and a display unit displaying the following distance at which the alarm activates when the detecting unit detected that the output signal of the sensor had remained unchanged for the prescribed time period.

The following distance alarming apparatus according to a still further aspect of the present invention includes an alarm unit outputting a warning sound, based on a following distance measurement signal, when a following distance between a subject vehicle and a preceding vehicle is decreased to a prescribed value, a detecting unit detecting that a value of the following distance measurement signal has remained unchanged for a prescribed time period, and a display unit displaying the following distance at which the alarm unit activates when the detecting unit detected that the value of the following distance measurement signal had remained unchanged for the prescribed time period.

The following distance alarming apparatus according to yet another aspect of the present invention includes an alarm unit outputting a warning sound, based on a following distance measurement signal, when a following distance between a subject vehicle and a preceding vehicle is decreased to a prescribed value, a detecting unit detecting that an output signal from a sensor having an output signal value changing in accordance with a driver's operation for control of a speed of the subject vehicle has remained unchanged for a prescribed time period, and a display unit displaying a difference between the following distance indicated by the following distance measurement signal and the following distance at which the alarm unit activates when the detecting unit detected that the output signal of the sensor had remained unchanged for the prescribed time period.

The following distance alarming apparatus according to a further aspect of the present invention includes an alarm unit outputting a warning sound, based on a following distance measurement signal, when a following distance between a subject vehicle and a preceding vehicle is decreased to a prescribed value, a detecting unit detecting that a value of the following distance measurement signal has remained unchanged for a prescribed time period, and a display unit displaying a difference between the following distance indicated by the following distance measurement signal and the following distance at which the alarm unit activates when the detecting unit detected that the value of the following distance measurement signal had remained unchanged for the prescribed time period.

The following distance alarming apparatus according to a still further aspect of the present invention includes an alarm unit outputting a warning sound, based on a following distance measurement signal, when a following distance between a subject vehicle and a preceding vehicle is decreased to a prescribed value, an input circuit provided to the subject vehicle, and a display unit displaying a distance at which the alarm unit activates.

The following distance alarming apparatus according to an additional aspect of the present invention includes an alarm unit outputting a warning sound, based on a following distance measurement signal, when a following distance between a subject vehicle and a preceding vehicle is decreased to a prescribed value, an input circuit provided to the subject vehicle, and a display unit displaying a difference between a distance to the preceding vehicle indicated by the following distance measurement signal and a distance at which the alarm unit activates based on an input signal from the input circuit.

The foregoing and other objects, features, aspects and effects of the present invention will become more apparent from the following detailed description of the present invention with reference to the accompanying drawings.

DESCRIPTION OF THE PREFERRED EMBODIMENTS

In the following, embodiments of the present invention will be described in detail with reference to the accompanying drawings.

First Embodiment

Figure 1:
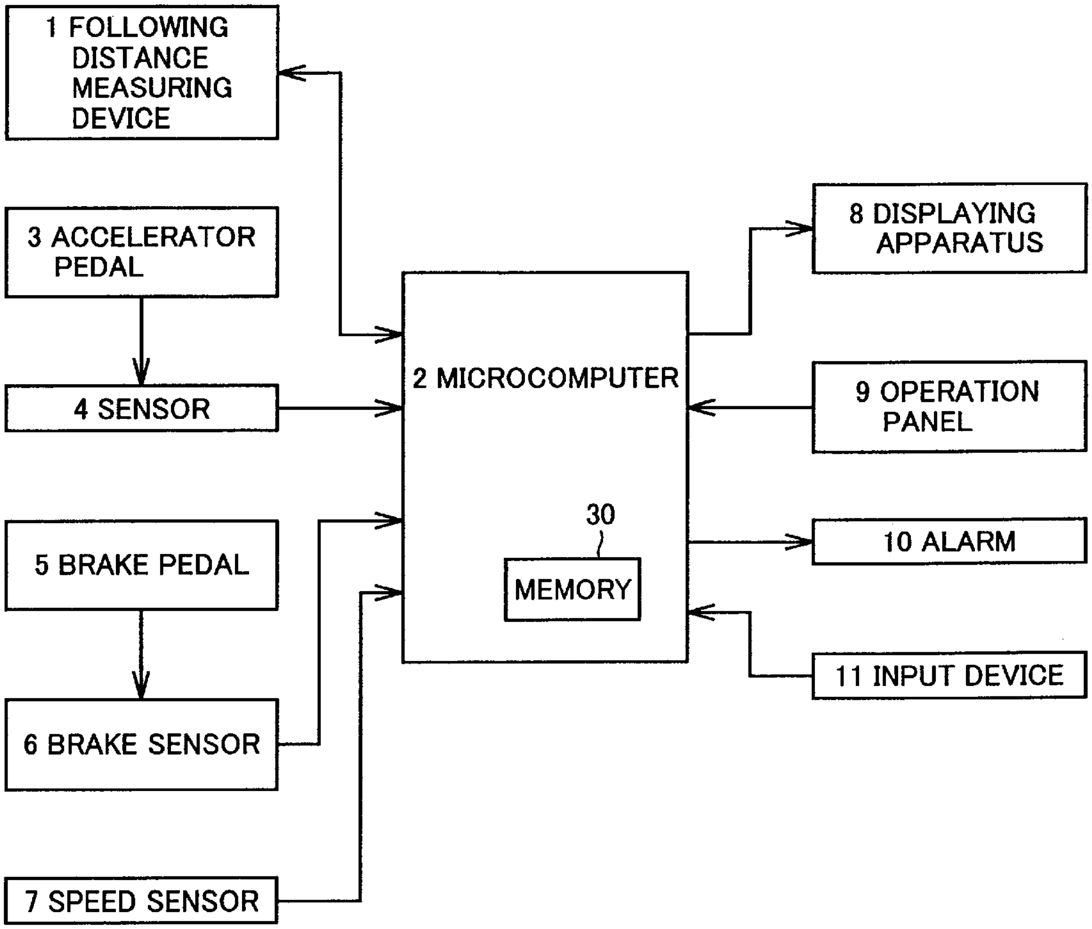
FIG. 1 is a block diagram showing an electrical structure of a following distance alarming apparatus according to a first embodiment to which the present invention is applied.

With reference to FIG. 1, the collision alarming apparatus according to the first embodiment is mounted on a subject vehicle for use. It includes a following distance measuring device 1 for measuring a distance from the subject vehicle to a preceding vehicle, which may be a radar system that measures the following distance using a laser beam or a millimeter wave, or a system that measures the following distance by image processing.

The collision alarming apparatus further includes: a microcomputer 2 receiving an output of following distance measuring device 1; an operation panel 9 provided in the vicinity of a driver's seat for a driver to operate microcomputer 2; a following distance displaying apparatus 8 receiving a signal indicative of a following distance from microcomputer 2 and displaying the following distance; an alarm 10 receiving an alarm signal from microcomputer 2 and generating a warning sound; and an input device 11 having a switch used by the driver to instruct microcomputer 2 to take out a measurement value of the following distance measured by following distance measuring device 1. The switch is a press button in the present embodiment.

The output of following distance measuring device 1 is applied to microcomputer 2. Microcomputer 2 also receives outputs from a sensor 4, a brake sensor 6, and a speed sensor 7. Sensor 4 outputs a signal that changes proportional to the amount or pressure of depression of an accelerator pedal 3. In this embodiment, it is a throttle opening sensor that detects the degree of opening of a throttle valve. It can be said that both the accelerator pedal and the brake are apparatuses for controlling the speed of the subject vehicle.

Microcomputer 2 has a well-known structure including a CPU (Central Processing Unit) and a memory (30). The memory (30) is preferably non-volatile, although it may be volatile as long as a power source is backed up. Microcomputer 2 realizes the collision distance alarming apparatus by executing a program having a control structure shown by a flow chart which will be described below.

Brake sensor 6 detects when a brake pedal 5 is stepped on. Speed sensor 7 outputs, as a speed signal, a wheel speed pulse in accordance with the amount of rotation of an encoder wheel provided at a rotation axis of a tire, for example. When an automobile is equipped with an anti-lock brake system, its output may be used as the speed signal. Alternatively, a signal output from a speed sensor for a speedometer may be used. It can be said, in a broad sense, that speed sensor 7 also works with the apparatus for speed control.

Microcomputer 2 conducts processing which will be described later based on a signal from each of the above-described detectors or sensors, and further conducts processing to display the result on displaying apparatus 8. In addition, when determined that the subject vehicle might collide with a vehicle running ahead, microcomputer 2 activates alarm 10 to remind the driver of the subject vehicle of the possibility of collision.

The operation for changing an initial set value and others for microcomputer 2 can be executed via operation panel 9. Further, the driver is allowed to arbitrarily execute the processing which will be described later by pressing the push button or switch of input device 11.

Figure 2:
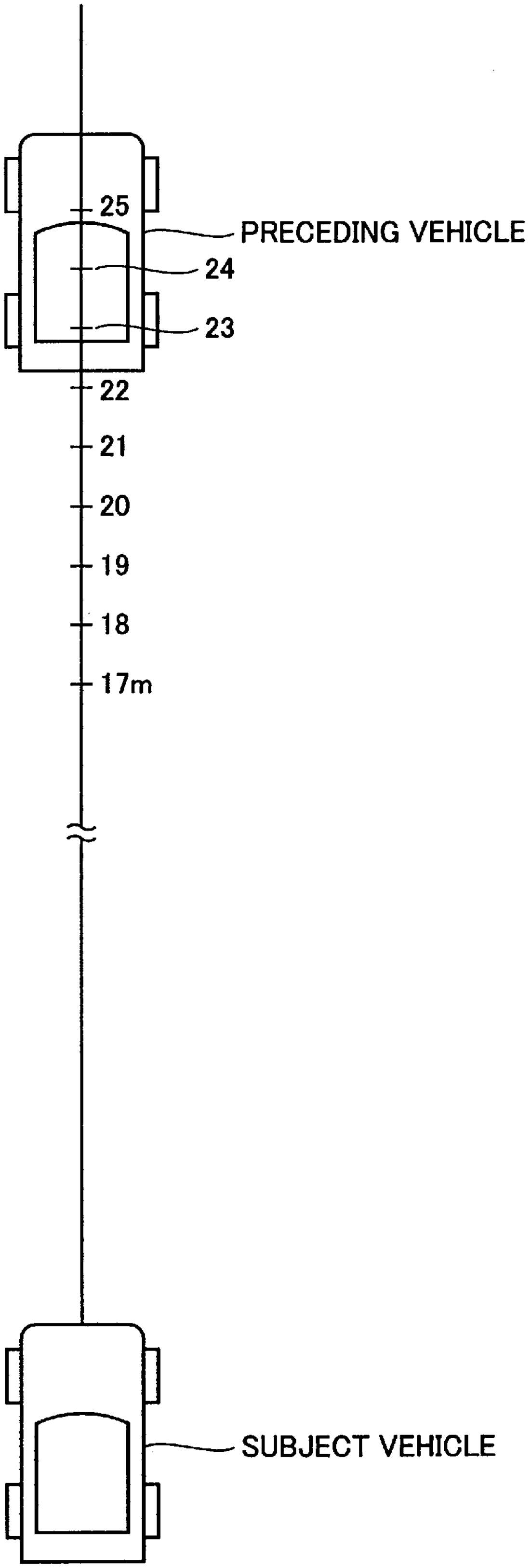
FIG. 2 schematically shows a distance relation between a preceding vehicle and a subject vehicle to explain the workings of the following distance alarming apparatus according to the first embodiment.

FIG. 2 shows a distance relation between the subject vehicle and the preceding vehicle to explain the workings of the following distance alarming apparatus of the first embodiment. In FIG. 2, by way of example, following distance measuring device 1 mounted to the subject vehicle has measured a following distance of 22 meters to the preceding vehicle.

Figure 3:
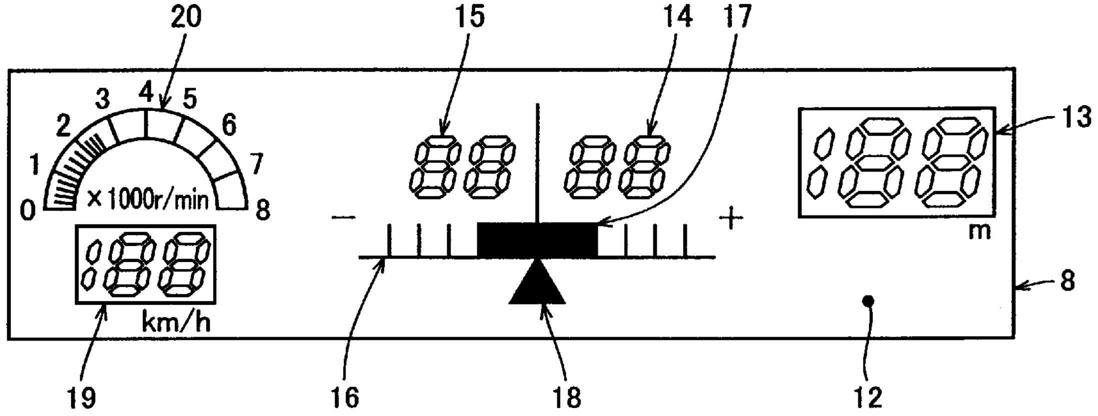
FIG. 3 shows a screen arrangement of a following distance displaying apparatus of the present invention, which is displayed on a liquid crystal display.

FIG. 3 shows a screen of a liquid crystal display 12 of displaying apparatus 8 that displays operating states of following distance alarming apparatus of the first embodiment. With reference to FIG. 3, liquid crystal display 12 includes a following distance display portion 13 for digitally displaying a following distance to the preceding vehicle measured by following distance measuring device 1 on liquid crystal display 12, and an alarm distance display portion 14 for digitally displaying a distance (hereinafter, simply referred to as "alarm distance") at which alarm 10 activates when there is danger of (rear-end) collision between the subject vehicle and the preceding vehicle.

In the example illustrated in FIG. 3, following distance display portion 13 displays the numeric value "22" reflecting the situation illustrated in FIG. 2. Alarm 10 activates when there is danger of collision of the subject vehicle with the preceding vehicle, and alarm distance display portion 14 digitally displays the distance at which alarm 10 activates.

Liquid crystal display 12 further includes an approach distance display portion 15 for digitally displaying a difference between the numeric value displayed at following distance display portion 13 and the numeric value displayed at alarm distance display portion 14 (hereinafter, this will be simply referred to as "approach distance"). Approach distance display portion 15 displays how many meters are left before the current following distance measured by following distance measuring device 1 reaches the following distance displayed at alarm distance display portion 14.

With reference to FIG. 3, liquid crystal display 12 further includes: a scale 16 indicating values corresponding to output signal values from sensor 4 as the speed control apparatus of the subject vehicle; a zone portion 17 provided at the center of scale 16 and highlighted by pattern or color different from that of scale 16; a pointer 18 indicating a value corresponding to an output signal from sensor 4; a speed display portion 19 responsive to a signal from speed sensor 7 of the subject vehicle for digitally displaying the running speed, and a tachometer 20 displaying the engine speed as a bar graph.

Scale 16 displays graduations of output signal values from sensor 4, which is, e.g., a throttle valve opening sensor or an engine speed sensor.

Zone portion 17 shows an allowable range of the output signal value from sensor 4 with respect to a predetermined reference value, which is used to determine whether the operation of the following distance alarming apparatus should be stopped, whether there is a possibility of collision, and others. A width of zone portion 17 (or a range for the reference value) can be increased or decreased arbitrarily by a modulator (not shown) provided at operation panel 9, which allows criteria for determination of danger of collision to be adjusted to driver's driving characteristics.

Pointer 18 indicating a value corresponding to the output signal value from sensor 4 moves rightward and leftward along the scale 16 as the output signal value changes.

Figure 4:
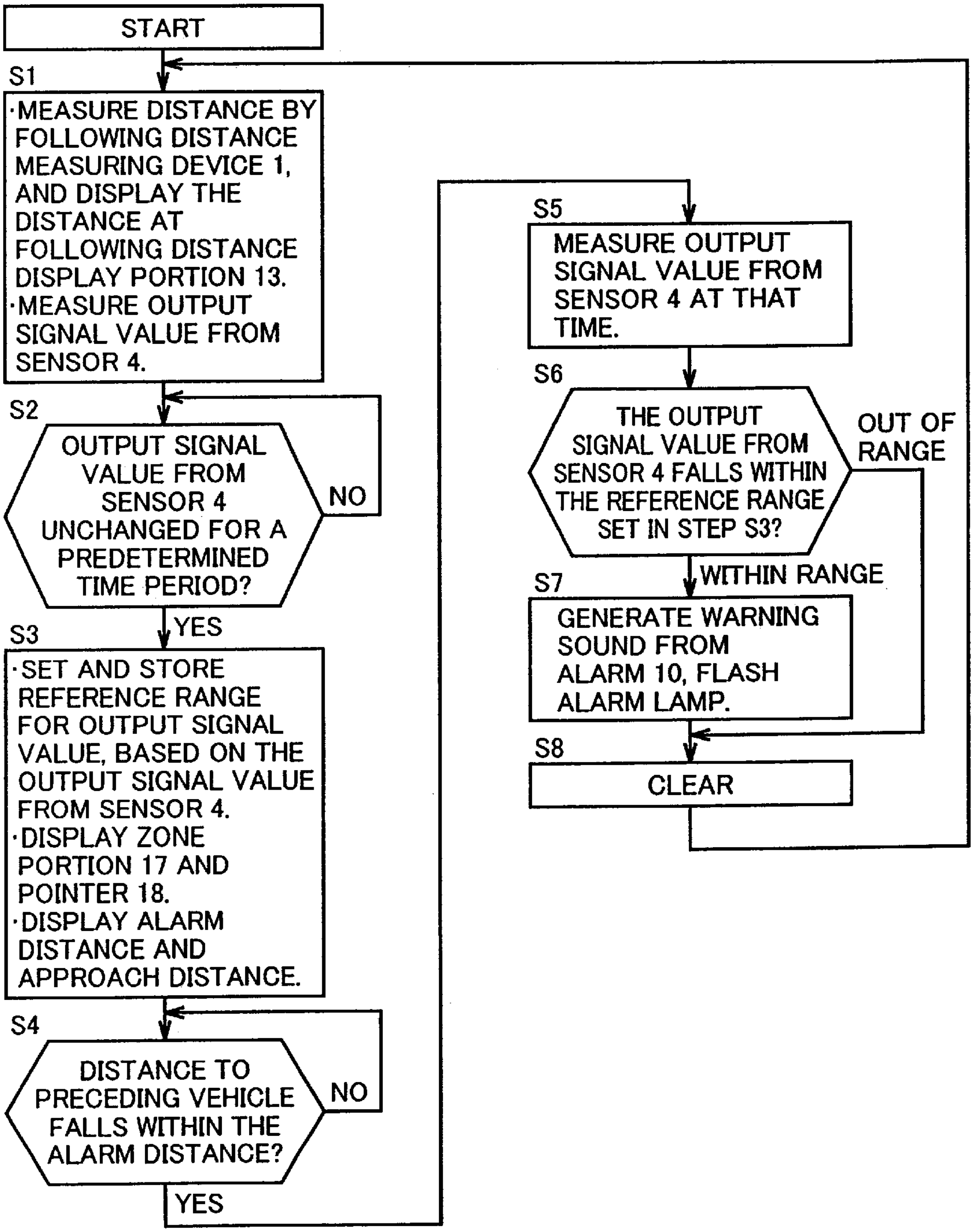
FIG. 4 is a flow chart showing an operation of the following distance alarming apparatus according to the first embodiment.

FIG. 4 is a flow chart illustrating the operation of the following distance alarming apparatus of the first embodiment. Its structure and workings will now be described with reference to aforementioned FIGS. 1–3. In step S1, following distance measuring device 1 mounted on the subject vehicle measures a following distance to the preceding vehicle. In the following description, it is assumed that the following distance is 22 meters, as shown in FIG. 2. The numeric value "22" is indicated at following distance display portion 13 on liquid crystal display 12 of displaying apparatus 8.

Output signal values from sensor 4 are measured constantly. Microcomputer 2 constantly checks whether the output signal values measured have remained unchanged for a predetermined period of time (e.g., for two seconds) (step S2). For example, assuming that the output signal from sensor 4 at a certain time point has an absolute value of 30, it is examined whether the output signals have maintained the value of 30 for the predetermined time period. This predetermined time period can be changed arbitrarily by the modulator on operation panel 9, to be adjusted to driver's driving characteristics.

Determination whether a predetermined time has elapsed from when the subject vehicle started travelling right behind the preceding vehicle (hereinafter, this state is referred to as "follow-up travel state") may be made in the following manner. First, a following distance to the preceding vehicle is measured by following distance measuring device 1. The following distance is measured again after a lapse of the predetermined time. A difference between the following distance initially measured and the one measured later is examined to determine whether a predetermined time has elapsed from when the preceding vehicle and the subject vehicle entered the follow-up travel state. In other words, if the measured following distance remained unchanged for a predetermined time, it is determined that the predetermined time has elapsed from when the follow-up travel state was attained.

When detected that the output signal values from sensor 4 remained unchanged for a predetermined time period in step S2, microcomputer 2 reads the output signal value from sensor 4 at that time, and sets a reference range for the output signal value based on the relevant value. The reference range is stored in a memory (30) or a register in microcomputer 2. For example, if the relevant output signal value from sensor 4 has an absolute value of 30 and an allowable range is predetermined as ±5, then the reference range for the output signal value is set from 25 to 35, and is stored in the memory (30) within microcomputer 2.

Furthermore, as shown in the display screen of liquid crystal display 12 in FIG. 3, zone portion 17 of scale 16 and pointer 18 indicative of a change of the output signal value from sensor 4 are lighted for display (step S3). The width (range) of zone portion 17 displayed corresponds to the reference range for the output signal value that has been set and stored in microcomputer 2 as described above. When initially lighted, pointer 18 is located at the center of zone portion 17 in scale 16. It then starts moving rightward and leftward along scale 16, in accordance with the change of the output signal value from sensor 4. More specifically, pointer 18 moves to the + side of scale 16 when the output signal value from sensor 4 becomes larger than the output signal value that remained unchanged in step 2, while it moves to the – side when the value becomes smaller. When pointer 18 comes out of zone portion 17 (or the reference range set for the output signal value), the light for the display of pointer 18 is put off, or the pattern or color of pointer 18 is changed, to make it easily perceived by the driver (e.g. the pointer which was painted out when it was within zone portion 17 is changed to an outline pointer when it comes out of the zone). In place of, or in addition to, such a change of the displaying manner of pointer 18, the displaying manner of zone portion 17 may be changed in the similar manner, or the light thereof may be put off.

Further, in step S3, the alarm distance preset corresponding to the following distance of 22 meters measured at the time when the output signal values from sensor 4 remained unchanged for the predetermined time period is displayed at alarm distance display portion 14 of liquid crystal display 12. The alarm distances are preset corresponding to the respective following distances measured at the aforementioned time, and stored in the memory (30) in microcomputer 2. More specifically, the distance at which alarm 10 activates in step S7 based on the determination of the possibility of collision in step S6 is displayed.

In the example illustrated in FIG. 2, the following distance measured when the output signal values from sensor 4 remained unchanged for a predetermined time period is 22 meters. It is now assumed that a distance of, e.g., 17 meters is prestored corresponding to the following distance of 22 meters in the memory (30) of microcomputer 2. In this case, the numeric value "17" is displayed at alarm distance display portion 14, which remains unchanged until the flow currently in operation in the following distance alarming apparatus is cleared (including the clear in the middle course of operation). The alarm distances preset corresponding to the respective measured distances can be changed arbitrarily by the modulator on operation panel 9, allowing adaptation of the alarm distance to driver's driving characteristics.

At approach distance display portion 15 provided adjacent to alarm distance display portion 14, a numeric value (e.g., "5") representing a difference between the numeric value (e.g., "22") displayed at aforementioned following distance display portion 13 and the numeric value (e.g., "17") displayed at alarm distance display portion 14 is displayed. The numeric value displayed at approach distance display portion 15 allows the driver to recognize with ease that reduction of the following distance by 5 more meters will cause it to reach the alarm distance of 17 meters and thus alarm 10 will activate. If another car interrupts between the preceding vehicle and the subject vehicle and the distance becomes, for example, 14 m within the alarm distance of 17 meters, then the numeric value "–3" will be displayed at approach distance display portion 15.

The approach distance being preset may be varied according to the distance displayed at following distance display portion 13, or according to the magnitude of the following distance at which the output signal values from sensor 4 remained unchanged for a predetermined time period. For example, a long approach distance of, e.g., 20 meters may be set when the following distance is long, e.g., approximately 100 meters. Conversely, a short approach distance of, e.g., 3 meters may be set when the following distance is short, e.g., approximately 15 meters.

Thereafter, as the distance between the subject vehicle and the preceding vehicle decreases, the numeric value "22" indicated at following distance display portion 13 is decremented to 21, 20, 19 . . . , while the numeric value "17" indicated at alarm distance display portion 14 remains unchanged until the flow in operation is cleared. Accordingly, the numeric value "5" indicated at approach distance display portion 15 is also decremented to 4, 3, 2 . . . in line with the change of the numeric value at following distance display portion 13.

In step S4, it is determined whether the following distance between the preceding vehicle and the subject vehicle falls within the alarm distance of 17 meters. If so, the control proceeds to step S5. More specifically, the control proceeds to step S5 when the numeric value indicated at approach distance display portion 15 decreases to 0, or it becomes a negative numeric value because another car has cut in.

In step S5, the output signal value from sensor 4 is measured, and in step S6, it is examined whether the output signal value measured in step S5 falls within the reference range for the output signal value set and stored in step S3. Then, based on whether the signal value is within the predetermined range, it is determined whether there is a chance of collision. If the signal value is within the predetermined range, it is understood that the driver of the subject vehicle has not taken appropriate measures, such as releasing accelerator pedal 3, although the subject vehicle has come closer to the preceding vehicle. Thus, in order to inform the driver of danger of collision, alarm 10 gives a warning sound for a predetermined period of time, and an alarm lamp is turned on and off on liquid crystal. display 12 in step S7. Instead of the alarm lamp, the numeric value of “0” or the negative value initially displayed at approach distance display portion 15 may be flashed on and off for a predetermined period of time.

The determination in step S6 as to whether the output signal value is within the allowable range can be made by the driver by visually checking whether pointer 18 is located within zone portion 17 of scale 16 displayed on liquid crystal display 12. The range of zone portion 17 (or the reference range for the output signal value) may be preset to vary in accordance with the magnitude of the output signal value which was determined to have remained unchanged for a predetermined time period in step S2.

After alarm 10 operates for the predetermined time period in step S7, or if the output signal value read in step S6 for determination of the chance of collision is outside the allowable range, the operation of the collision alarming apparatus is cleared (step S8) to return to the starting point. Then, the above-described flow is executed again based on the distance measured by following distance measuring device 1 and the output signal value from sensor 4.

As explained above, according to the first embodiment, likelihood of collision is determined based on driver’s reaction to a decrease of the following distance between the subject vehicle and the preceding vehicle. More specifically, the possibility of collision is determined, based on the output signal value from sensor 4 that changes corresponding to the driver’s operation of accelerator pedal 3, by examining whether the driver has taken appropriate measures against the decrease of the following distance, through measurement of the change of the output signal value from sensor 4 in accordance with the decrease of the following distance.

In the first embodiment, the displaying manner of pointer 18 or zone portion 17 was made to change or the light therefor was turned off when the output signal value from sensor 4 came out of the reference range for the output signal value set and stored in step S3 (step S6), or when pointer 18 came off the range of zone portion 17. Alternatively, the light for the numeric value displayed at alarm distance display portion 14 or approach distance display portion 15 may be turned off, or displaying manner thereof, such as size, color or pattern, may be changed, to inform the driver of the relevant situation.

Second Embodiment

Next, a following distance alarming apparatus of the second embodiment will be described with reference to the flow chart of FIG. 5. The apparatus of the second embodiment is identical to that of the first embodiment in terms of the electrical structure, the distance relation between the preceding vehicle and the subject vehicle, and the contents on the screen of liquid crystal display 12 of following distance displaying apparatus 8, as explained above with reference to FIGS. 1–3. Thus, the same or corresponding components (portions) are denoted by the same reference character, and detailed description thereof will not be repeated where appropriate.

Figure 5:
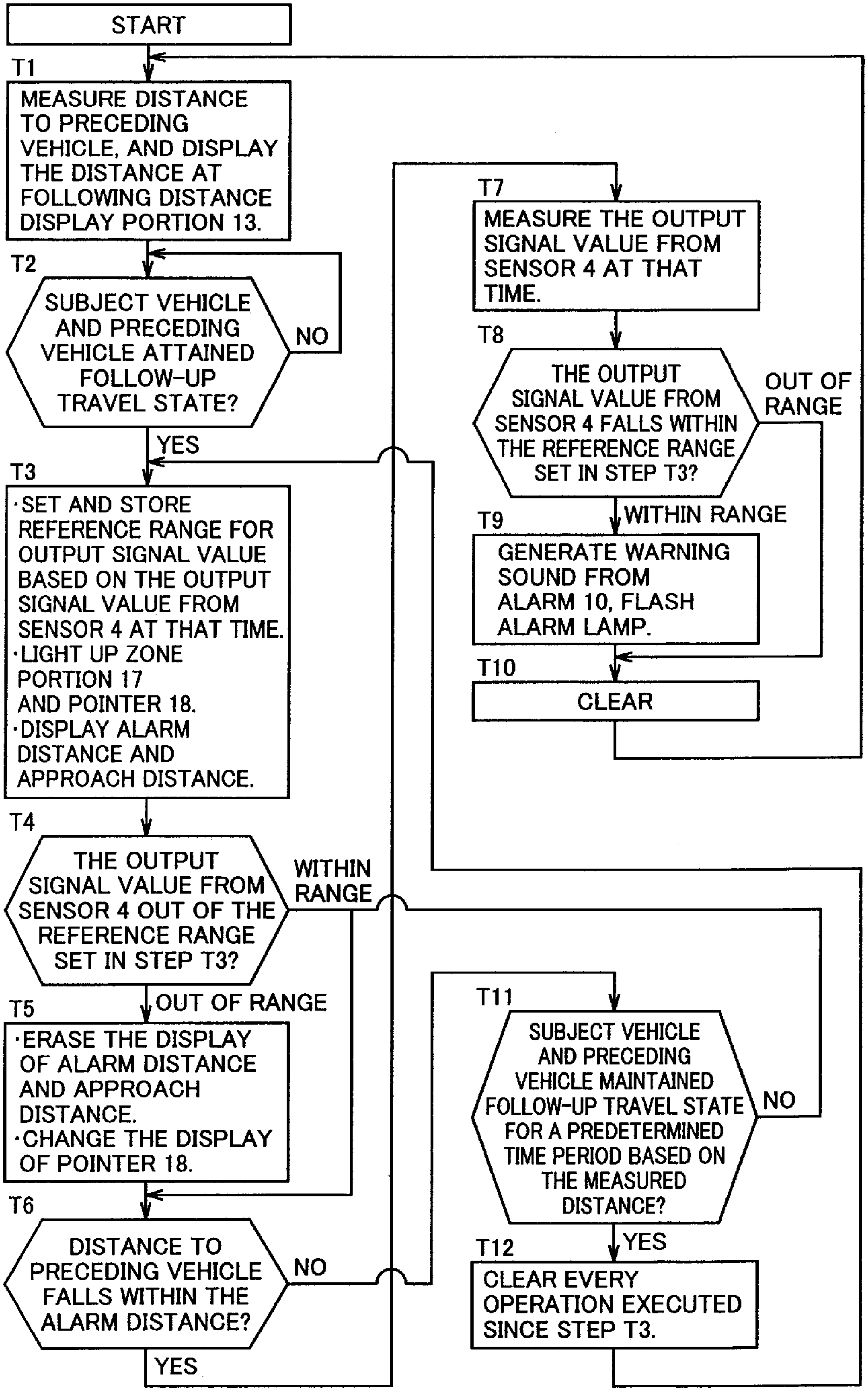
FIG. 5 is a flow chart showing an operation of a following distance alarming apparatus according to a second embodiment to which the present invention is applied.

In the flow chart of FIG. 5, in step T1, a distance from the subject vehicle to the preceding vehicle is measured by following distance measuring device 1 mounted on the subject vehicle. Here, the distance is assumed to be 22 meters, as shown in FIG. 2. The numeric value “22” is displayed at following distance display portion 13 on liquid crystal display 12. Microcomputer 2 determines, based on the measured distance of 22 meters, whether the preceding vehicle and the subject vehicle have maintained the follow-up travel state for a predetermined time period (e.g., 2 seconds) (step T2). This predetermined time period can be changed arbitrarily through the modulator on operation panel 9 to be adapted to the driver’s driving characteristics.

The determination as to whether the follow-up travel state has been maintained for the predetermined time period may be made in the following manner. First, a following distance to the preceding vehicle is measured by following distance measuring device 1. The following distance is measured again after a lapse of the predetermined time. A difference between the following distance initially measured and the one measured later is then examined, to determine whether the follow-up travel state was maintained for the predetermined time period. Alternatively, it is possible to examine how long the following distances equal to the one initially measured were measured continuously, or how long the relevant distance was maintained. In this case, the determination whether the follow-up travel state was maintained for the predetermined time period can be made by checking whether the time period during which the relevant distance was maintained reached the predetermined time period.

When the following distance to the preceding vehicle measured remained unchanged for a predetermined time period, it is determined that the follow-up travel state was maintained for the predetermined time period. Thus, steps T2, T11 of the flow chart in FIG. 5 can be changed to read: “The measured following distance remained unchanged for a predetermined time period?” The same applies to steps P2, P8 of the flow chart in FIG. 7, which will be described later.

When detected that the follow-up travel state was maintained for a predetermined time period in step T2, microcomputer 2 reads the output signal value from sensor 4 at that time. A reference range for the output signal value is set based on this value, and stored in a memory (30) within microcomputer 2 (step T3). For example, if the relevant output signal value from sensor 4 has an absolute value of 30 and an allowable range is predetermined as ±5, then the reference range for the output signal value is set from 25 to 35, and is stored in the memory (30) within microcomputer 2. This reference range for the output signal value stored is employed for determination of a chance of collision, which will be described later.

In step T3, the alarm distance having been preset corresponding to the following distance of 22 meters at the time when the follow-up travel state was detected in step T2 is displayed at alarm distance display portion 14 on liquid crystal display 12 shown in FIG. 3. The alarm distances are preset for respective following distances which were initially measured and with which the follow-up travel state was maintained for a predetermined time period, and are stored in the memory (30) within microcomputer 2. That is, the distance at which alarm 10 activates in step T9 according to the determination of likelihood of (rear-end) collision made in step T8 is displayed.

Assume that a distance of, e.g., 17 meters is prestored in the memory (30) of microcomputer 2 with respect to the following distance of 22 meters initially measured and employed for the determination whether the follow-up travel state was maintained for a predetermined time period. In this case, the numeric value “17” is displayed on alarm distance display portion 14, and is kept unchanged until the flow currently in operation is cleared (including the clear in the middle course of operation).

The alarm distances preset corresponding to the respective following distances at which the follow-up travel state was maintained for a predetermined time period can be changed arbitrarily by the modulator on operation panel 9. For example, the aforementioned alarm distance of 17 meters for the following distance of 22 meters may be increased to 19 meters or decreased to 15 meters. This allows adaptation of the alarm distance to driver's driving characteristics.

At approach distance display portion 15 provided adjacent to alarm distance display portion 14, a numeric value (e.g., "5") representing a difference between the numeric value (e.g., "22") displayed at following distance display portion 13 and the numeric value (e.g., "17") displayed at alarm distance display portion 14 is displayed. The numeric value displayed at approach distance display portion 15 allows the driver to recognize with ease that reduction of the following distance by 5 more meters will cause it to reach the alarm distance of 17 meters and thus alarm 10 will activate. Assume that another car cuts in between the preceding vehicle and the subject vehicle. In this case, if the distance from the subject vehicle to the vehicle that has cut in is within the alarm distance of 17 meters, the relevant numeric value is displayed on approach distance display portion 15. For example, if the relevant distance is 14 meters, the numeric value "−3" is displayed at approach distance display portion 15.

The approach distance being preset may be varied according to the distance displayed at following distance display portion 13, or according to the magnitude of the following distance at which the follow-up travel state was attained. For example, a long approach distance of, e.g., 20 meters may be set when the following distance at which the follow-up travel state was attained is long, e.g., approximately 100 meters. Conversely, a short approach distance of, e.g., 3 meters may be set for the short following distance of, e.g., approximately 15 meters.

In step T3, as shown in the display screen of liquid crystal display 12 in FIG. 3, zone portion 17 and pointer 18 indicative of a change of the output signal value from sensor 4 are lighted for display. The width (range) of zone portion 17 corresponds to the reference range (from 25 to 35) for the output signal value that has been set and stored in microcomputer 2 as described above. When initially lighted, pointer 18 is located at the center of zone portion 17. It then starts moving rightward and leftward along scale 16, in accordance with the change of the output signal value from sensor 4. More specifically, pointer 18 moves to the + side of scale 16 when the output signal value from sensor 4 becomes greater than that measured when the follow-up travel state was maintained for a prescribed time period in step T2, while it moves to the − side when it becomes smaller.

If the output signal value from sensor 4 subsequently measured falls within the reference range having been set (step T4), the system flow proceeds to step T6. If the output signal value from sensor 4 is out of the reference range, i.e., if pointer 18 comes off the range of zone portion 17, then the process goes to step T5. In step T5, the numeric values of alarm distance and approach distance displayed in step T3 are erased, or displaying manner thereof is changed (by changing, e.g., the color, size or pattern of display). This allows the driver to easily recognize that, if the current state remains unchanged, alarm 10 will not give a warning sound even if the distance between the subject vehicle and the preceding vehicle reduces to the alarm distance.

When pointer 18 comes off the range of zone portion 17, displaying manner of pointer 18 is also changed by changing color, size or pattern thereof. For example, the pointer 18 which was painted out when it was within zone portion 17 is changed to an outline pointer 18 when it comes out of zone portion 17. The displaying manner of zone portion 17 can also be changed in the similar manner.

If the output signal value from sensor 4 comes to fall within the reference range having been set (i.e., pointer 18 comes within zone portion 17) before the flow is cleared in step T10, then the numeric values of alarm distance and approach distance and/or pointer 18 is displayed again, or displaying manner thereof returns to the initial state.

The output signal values from sensor 4 are measured constantly. As the distance between the subject vehicle and the preceding vehicle decreases while the output signal values from sensor 4 remain within the reference range set, the numeric value "22" indicated at following distance display portion 13 is decremented to 21, 20, 19 . . . The numeric value "17" indicated at alarm distance display portion 14, however, remains unchanged until the flow in operation is cleared. Accordingly, the numeric value "5" indicated at approach distance display portion 15 is also decremented to 4, 3, 2 . . . in line with the change of the numeric value at following distance display portion 13.

In step T6, when the following distance from the subject vehicle to the preceding vehicle falls within the alarm distance range of 17 meters, or, the numeric value displayed at approach distance display portion 15 comes to 0 or a negative value due to another car having cut in, then the control proceeds to step T7. In step T7, microcomputer 2 reads the output signal value from sensor 4 at that time. In step T8, it is determined whether the read value falls within the reference range for the output signal value set and stored in step T3. If the value is within the reference range, it is understood that the driver of the subject vehicle has not taken appropriate measures, such as releasing accelerator pedal 3, although the subject vehicle has come closer to the preceding vehicle. Thus, in order to inform the driver of danger of collision, alarm 10 gives a warning sound for a predetermined period of time, and an alarm lamp on liquid crystal display 12 is flashed on and off in step T9.

After alarm 10 operates for the predetermined time in step T9, or when the output signal value from sensor 4 measured in step T8 is out of the reference range, the operation of the following distance alarming apparatus is cleared (step T10), and the control returns to the starting point. The flow is then resumed based on the following distance measured at that time.

In step T6, if the distance to the preceding vehicle measured by following distance measuring device 1 is greater than the alarm distance and is, e.g., 20 meters, then the control proceeds to step T11. In step T11, microcomputer 2 determines, based on this newly measured distance of 20 meters, whether the follow-up travel state has been maintained for a predetermined time period, as in step T2. If the follow-up travel state has been maintained for the predetermined time period with this newly measured distance of 20 meters, then in step T12, the reference range for the output signal value stored in the previous step T3 is cancelled, and display of the numeric values at alarm distance display portion 14 and approach distance display portion 15 and of zone portion 17 and pointer 18 are all erased.

The control then returns to step T3, where a new reference range for the output signal values is set and stored based on the output signal value from sensor 4 at the time when the follow-up travel state was maintained for a predetermined time period with the following distance of 20 meters. Alarm distance display portion 14 also displays the alarm distance that was preset corresponding to the distance of 20 meters. If the alarm distance of 15 meters is set therefor, the numeric value "15" is displayed at the display portion 14. In response, the numeric value of "5" is displayed at approach distance display portion 15. Zone portion 17 and pointer 18 are again displayed. The subsequent procedures are as described above.

The following distance newly employed for determination of the follow-up travel state in step T11 was set to 20 m above, not to 21 m as the direct neighbor of the initially measured 22 m, due to the following reason. In the present embodiment, in determination of the follow-up travel state of the preceding vehicle and the subject vehicle, a prescribed width of margin is allowed above and below the initially measured distance, and the following distance within the margin is determined unchanged. The width may be, e.g., ±1 m, although it is not limited thereto. In the present embodiment, a margin of ±1 m is set for the following distance of 22 m measured in step T1. Thus, the distance from 21 m to 23 m is considered unchanged when the follow-up travel state with respect to the initially measured distance of 22 m is being examined. If the distance between the preceding vehicle and the subject vehicle decreases to, e.g., 20 m, then the distance for determination of the follow-up travel state becomes from 19 m to 21 m; ±1 m of the distance of 20 m. If the distance further decreases to 18 m, then the target range becomes from 17 m to 19 m. Accordingly, in the present embodiment, when the subject vehicle comes closer to the preceding vehicle than in the state with the following distance of 22 m, the following distance that should be considered next is 20 m.

This however does not apply to the case where the follow-up travel state is once detected in step T2 and the state is newly detected in step T11. In this case, the detection in step T11 is made with respect to a newly measured distance with a prescribed width of margin as described above. Thus, it may be 22 m, the same as in step T2, or may be 23 m or 21 m, the direct neighbor thereof.

Although the second embodiment has been described above, various modifications thereof are conceivable. In step T4 of the second embodiment, the display of the alarm distance or approach distance or pointer 18 is erased, or displaying manner thereof is changed (step T5), even if the output signal value from sensor 4 comes out of the reference range set therefor only instantaneously. Such execution of step T5 every time the output signal value instantaneously comes off the reference range may be cumbersome for the driver. Thus, a time factor may be added to the determination in step T4 such that determination is made as to whether the output signal values from sensor 4 have remained out of the reference range for a predetermined time period. This modification has an advantage to restrict the changes in display.

Further, in the second embodiment, when the output signal value from sensor 4 measured after step T3 comes off the set reference range (step T4), the display of the alarm distance, approach distance or pointer 18 is erased, or displaying manner thereof is changed (step T5), while the flow itself of the alarming apparatus continues. Alternatively, the system configuration may be changed such that, when the output signal value comes off the reference range in step T4, the flow proceeds to step T10 and the entire system operation is cleared (cancelled).

As explained above, according to the second embodiment, every time it is detected that the subject vehicle and the preceding vehicle have maintained the follow-up travel state for a predetermined time period, the operating states of the following distance alarming apparatus are changed based on the output signal value from sensor 4 or the following distance measured at that time. Thus, it becomes possible to realize a collision preventing apparatus that can accurately cope with travelling conditions. Since the output signal values from sensor 4 are monitored constantly, it is possible to allow the driver to immediately determine whether the following distance alarming apparatus correctly functions in accordance with the change in operation of accelerator pedal 3 working with sensor 4, or according to the change in driver's operation of the subject vehicle, by turning off the light for display of the numeric value of approach distance or alarm distance, or by changing displaying manner thereof. Accordingly, practicability of the apparatus is improved.

Third Embodiment

Next, a collision predicting apparatus of the third embodiment will be described. Since the third embodiment is applied to collision predicting apparatuses already proposed in the art, those conventional apparatuses will be outlined first.

In the conventional collision predicting apparatuses, a first reference distance and a second reference distance closer to the subject vehicle than the first distance are preset with respect to the distance between the subject vehicle and the preceding vehicle that is measured by following distance measuring device 1. A relative speed between the subject vehicle and the preceding vehicle is obtained from a time period from the detection of a distance between the two vehicles equaling the first reference distance until the detection of a distance within the second reference distance. When the relative speed is faster than a predetermined speed, it is determined that there is danger of collision, so that alarm 10 is activated. The relative speed between the subject vehicle and the preceding vehicle can also be determined based on whether a distance measured after a lapse of a fixed time from when the first reference distance was detected falls within the second reference distance.

Figure 6:
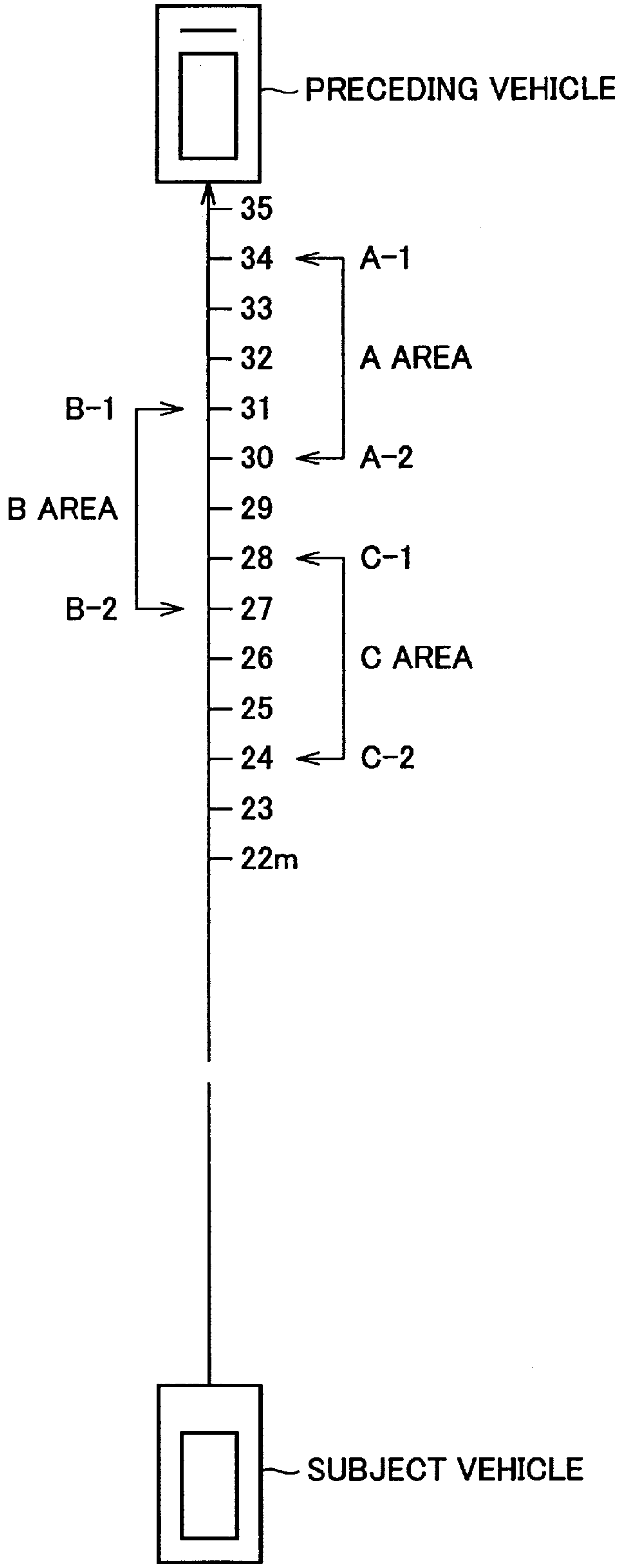
FIG. 6 schematically shows a distance relation between a preceding vehicle and a subject vehicle to explain the workings of a collision predicting apparatus according to a third embodiment to which the present invention is applied.

FIG. 6 shows a distance relation between the preceding vehicle and the subject vehicle to explain the operation of the collision predicting apparatus. In FIG. 6, reference distances for obtaining a relative speed are preset for respective distances. For example, divisional areas such as A area, B area, C area . . . are provided, and information (reference distances) specifying these areas is preset and stored in microcomputer 2. In the example illustrated in FIG. 6, in the A area, the first reference distance denoted by A-1 is set to 34 meters, and the second reference distance denoted by A-2 is set to 30 meters. In the B area, the first reference distance B-1 is set to 31 meters and the second reference distance B-2 is set to 27 meters. In the C area, the first reference distance C-1 is set to 28 meters and the second reference distance C-2 is set to 24 meters. Microcomputer 2 calculates the relative speed, based on a time from the detection of the first reference distance to the detection of the second reference distance at each area, to determine presence/absence of a possibility of collision.

Figure 7:
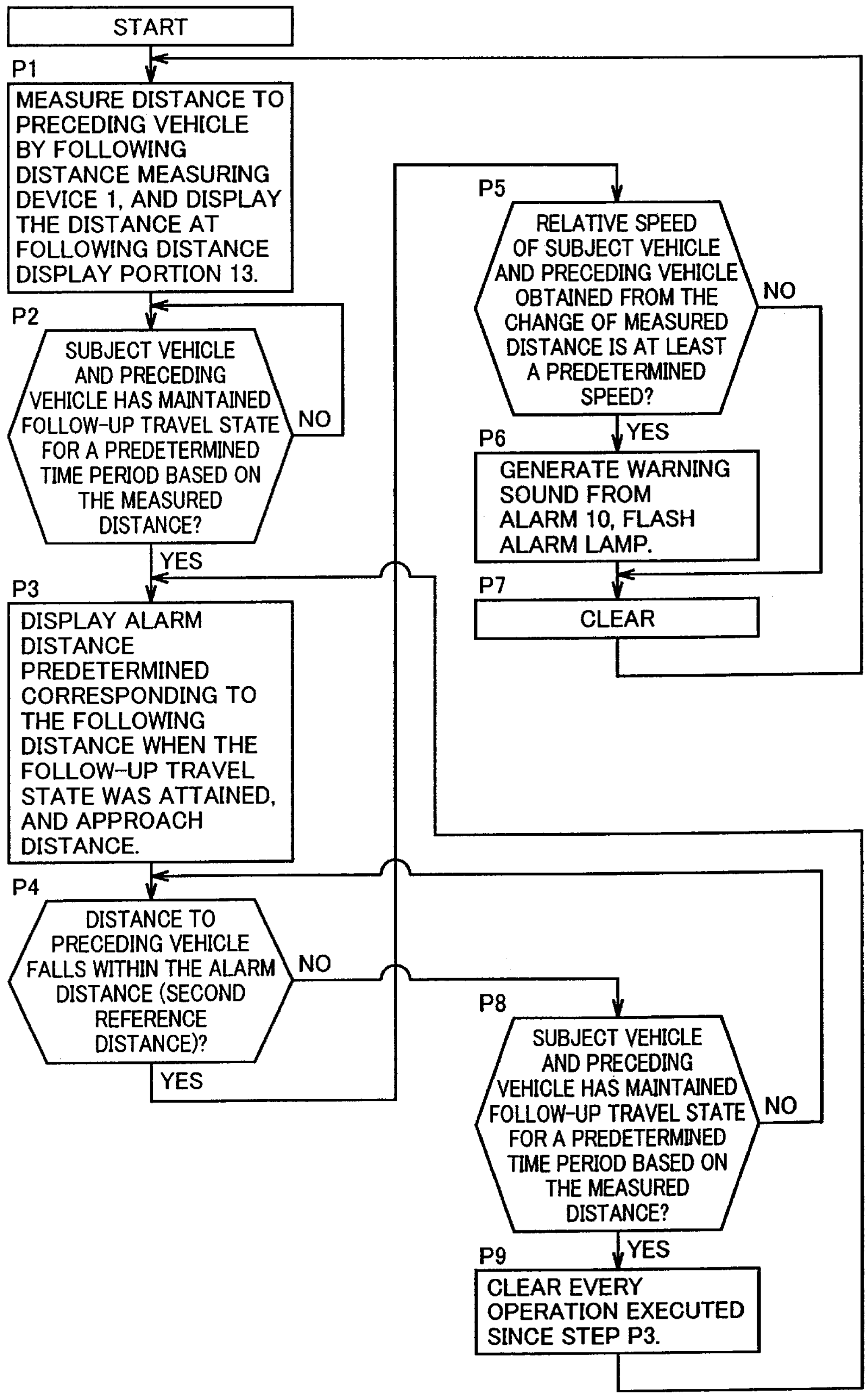
FIG. 7 is a flow chart showing an operation of the collision predicting apparatus according to the third embodiment.

FIG. 7 is a flow chart of the third embodiment, and its operation will be described with reference to the distance relation in FIG. 6. Since the screen arrangement of liquid crystal display 12 is the same as that of the second embodiment, the same or corresponding portions are denoted by the same reference character, and detailed description thereof will not be repeated here. In step P1, a distance to the preceding vehicle is measured by following distance measuring device 1 and the distance is displayed at following distance display portion 13 on liquid crystal display 12. Now assume by way of example that the distance is 35 meters as shown in FIG. 6. The numeric value "35" is displayed at following distance display portion 13. Then, microcomputer 2 determines, based on the distance of 35 meters, whether the preceding vehicle and the subject vehicle have maintained the follow-up travel state for a fixed time period, as in the second embodiment (step P2). If so, the control proceeds to step P3. The way of obtaining the follow-up travel state and the distance employed therefor may be the same as those explained in the second embodiment.

In step P3, a distance at which alarm 10 of the collision predicting apparatus activates is indicated at alarm distance display portion 14 of liquid crystal display 12. This distance has been preset with respect to the distance measured when it was determined that the follow-up travel state was maintained for the predetermined time period. In the example shown in FIG. 6, for the measured distance of 35 meters, the numeric value of 30 meters being the second reference distance in the A area is indicated at alarm distance display portion 14. This numeric value remains unchanged until the system in operation is cleared.

Furthermore, the numeric value "5" is indicated at approach distance display portion 15, which represents the difference between the numeric value "35" indicated at following distance display portion 13 and the numeric value "30 indicated at alarm distance display portion 14. This allows the driver to visually confirm that, when the vehicles come closer by 5 more meters from the currently measured distance of 35 meters, the following distance will reach the distance of 30 meters at which alarm 10 activates. The respective numeric values displayed on liquid crystal display 12 are changed according to the following distances subsequently measured, as described in the second embodiment, and determination is made in succession, based on the measured distances, whether the follow-up travel state has been attained (steps P2, P8). If a relative speed obtained by a time from when a measured distance becomes the first reference distance of 34 meters in the A area until it falls within a range of the second reference distance is faster than a predetermined speed, it is determined that there is danger of collision (step P5). In this case, after alarm 10 operates in step P6, as in the second embodiment, the clear processing is conducted (step P7), and the control returns to the starting point.

In steps P2 and P8, microcomputer 2 determines in succession whether the preceding vehicle and the subject vehicle have maintained the follow-up travel state, based on the measured distance changed. Here, if, e.g., the following distance of 35 meters measured in step P1 decreased to 32 meters because of the subsequent approach and the follow-up travel state was maintained for a predetermined time period with this distance ("YES" in step P8), then the control proceeds to step P9. In step P9, the numeric value of 30 at alarm distance display portion 14 and the numeric value at approach distance display portion 15 having been displayed from step P3 are erased. Further, calculation of the relative speed in the A area for causing the collision predicting apparatus to operate is also cleared. At the same time, the collision predicting apparatus starts operation now in the B area that has been preset for the distance of 32 meters at which the follow-up travel state was newly detected. The numeric value "27" at which alarm 10 activates, the same value as the second reference distance in the B area, is indicated at alarm distance display portion 14. The numeric value "5" representing a difference between the measured distance of 32 meters and the alarm distance of 27 meters is indicated at approach distance display portion 15.

As explained above, the third embodiment is directed to the improvement of the collision predicting apparatus that determines presence/absence of danger of collision between the subject vehicle and the preceding vehicle, based on the relative speed therebetween obtained from the times when the distance between the vehicles coincided with respective ones of two preset reference distances. More specifically, in the third embodiment, when the follow-up travel state has continued for a predetermined time, the alarm distance at which alarm 10 of the collision predicting apparatus activates, predetermined corresponding to the following distance at that time, and the approach distance representing the difference between the currently measured following distance and the alarm distance are indicated on liquid crystal display 12. When detected that the follow-up travel state has been maintained for a predetermined time period with a new following distance based on the following distances measured in succession, the area where the collision predicting apparatus operated during the previous follow-up travel state and the display of the alarm distance at that time and approach distance are erased (cleared). At the same time, determination is made whether there is a possibility of collision in the area where the collision predicting apparatus now operates, predetermined corresponding to the new following distance. Numeric values of the alarm distance and the approach distance are indicated on liquid crystal display 12.

Although the alarm distance and the second reference distance are the same in the third embodiment, they may be different from each other. For example, the alarm distance can be set to 29 meters with respect to the second reference distance of 30 meters. All that is needed is to predetermine relation between the distances.

Fourth Embodiment

Next, the function and workings of a following distance displaying apparatus according to the fourth embodiment will be described with reference to the flow chart of FIG. 8. The following distance displaying apparatus of the fourth embodiment is identical to the apparatus of the first embodiment in terms of the electrical structure of the apparatus, the distance relation between the preceding vehicle and the subject vehicle, and the screen arrangement of liquid crystal display 12, described above with reference to FIGS. 1–3. Thus, the same components (portions) are denoted by the same reference character, and detailed description thereof will not be repeated here. Further, in the description below, it is assumed that the relation between the currently measured following distance and the alarm and approach distances is the same as in the second embodiment.

Figure 8:
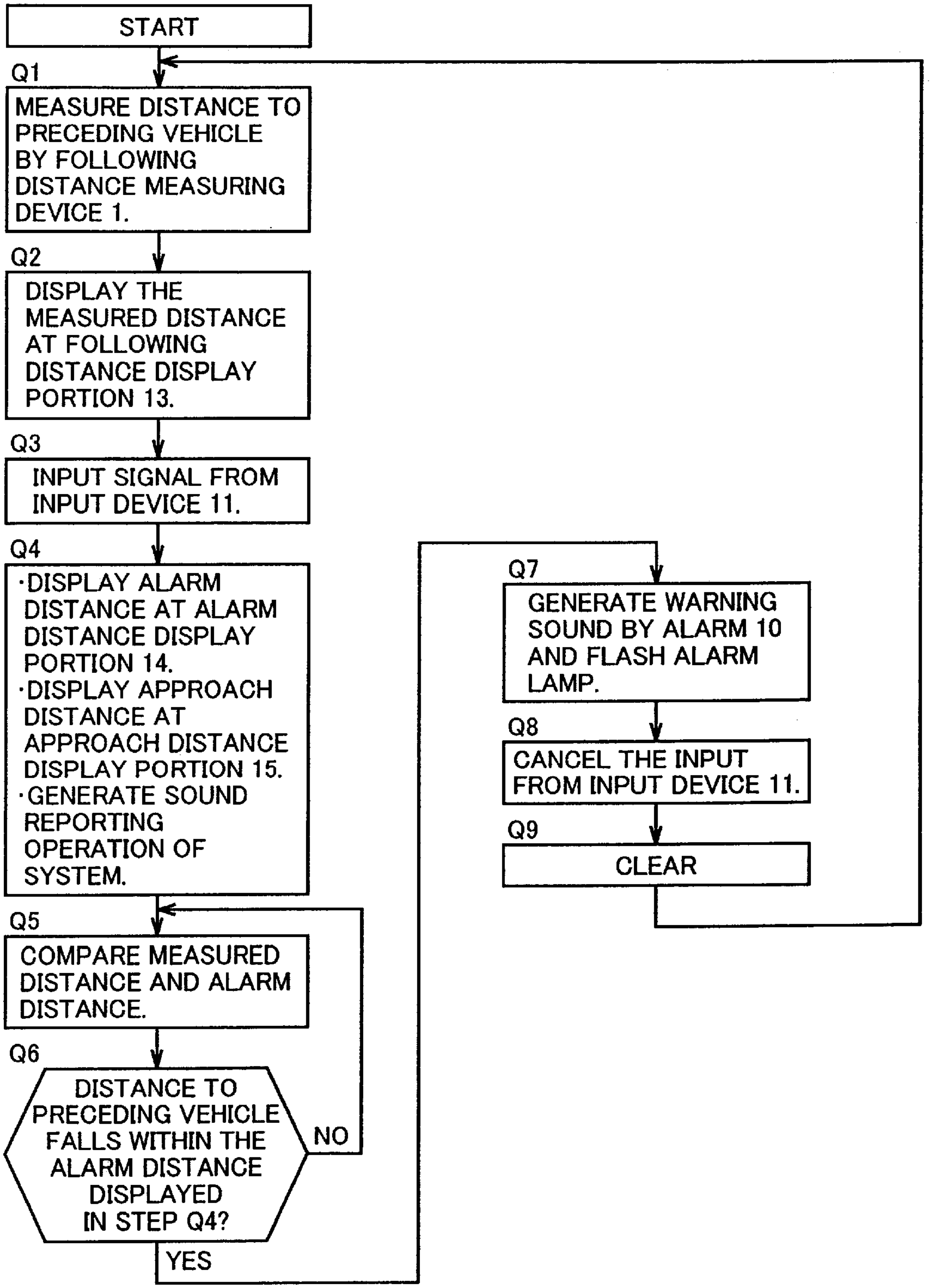
FIG. 8 is a flow chart showing an operation of a following distance alarming apparatus according to a fourth embodiment to which the present invention is applied.

Referring to the flow chart of the following distance displaying apparatus in FIG. 8, a distance to the preceding vehicle is measured by following distance measuring device 1 in step Q1, and the distance is displayed at following distance display portion 13 of liquid crystal display 12 in step Q2. In the example shown in FIG. 2, the numeric value "22" is indicated at following distance display portion 13. After the measurement of the distance, when the driver turns on a switch of input device 11 near at hand (step Q3), reading of a measurement value of the measured distance is started. The numeric value "17" of the alarm distance, at which alarm 10 activates in step Q7, is indicated at alarm distance display portion 14. This alarm distance is predetermined corresponding to the following distance of 22 meters measured at that time. The numeric value "5" is indicated at approach distance display portion 15, which represents a difference between the numeric value "22" indicated at following distance display portion 13 and the numeric value "17" indicated at alarm distance display portion 14 (step Q4). A distance relation between the measured distance of 22 meters and the corresponding alarm distance of 17 meters, i.e., the numeric value "5" as the approach distance, can be set arbitrarily by the modulator on operation panel 9, as described in the second embodiment. Alternatively, the approach distances may be preset such that they vary according to the magnitude of the measured distances.

As the following distance to the preceding vehicle changes, the numeric values indicated at following distance display portion 13 and approach distance display portion 15 are changed accordingly. The numeric value (e.g. "17") indicated at alarm distance display portion 14, however, remains unchanged until the flow in operation proceeds to step Q9 where the clear processing is conducted (or, until the measurement of distance is cancelled in the middle course). If the subject vehicle comes still closer to the preceding vehicle and it is determined in step Q6 that they are within the alarm distance, then the numeric value of "0" is indicated at approach distance display portion 15. This numeric value is indicated until input device 11 is released (the driver turns off the input switch) in step Q8. In step Q7, alarm 10 generates a warning sound. At this time, the alarm lamp is also flashed. Instead of the alarm lamp, the numeric value of "0" may be flashed, as in the second embodiment, or an indicator light additionally provided may be flashed. Further, in step Q7, it may be configured such that the system is automatically cleared after operation of alarm 10 for a prescribed time period, irrelevant to the release of input device 11 in step Q8, and the control returns to the starting point, as in the second embodiment. There may be a case where approach distance display portion 15 indicates a negative numeric value when another vehicle interrupts between the subject vehicle and the preceding vehicle, for example. In such a case, the negative numeric value is flashed on and off in step Q7, as described in the second embodiment.

Generation of a sound for confirmation of the system operation in step Q4, comparison between the measured distance and the alarm distance in step Q5 and processing executed in the subsequent steps will be readily realized by a person skilled in the art. This following distance alarming apparatus operates while input device 11 is turned on and thus performing the input operation. If the input operation is stopped (by turning off the device) while the system flow is in operation, the processing is cleared (cancelled) wherever the control resides in the flow.

As explained above, according to the fourth embodiment, the driver is allowed to manipulate input device 11 to make the alarm and approach distances displayed on liquid crystal display 12, as in the first embodiment, at an arbitrary time point. Therefore, in the fourth embodiment, unlike the first to third embodiments, it is unnecessary to wait for the output signal values from sensor 4 to remain unchanged for a prescribed time period or to wait for the preceding vehicle and the subject vehicle to maintain the follow-up travel state for a predetermined time period. As a result, a following distance alarming apparatus allowing the driver to quickly respond to travelling conditions can be realized. If the collision alarming apparatuses and the collision predicting apparatus in the first through third embodiments are each provided with this input device 11, and if their flows are each provided with a step of proceeding to the subsequent step(s) upon receipt of a signal from input device 11, instead of or in addition to the step of determining whether the output signal values from sensor 4 remained unchanged for a prescribed time period or the step of determining whether the follow-up travel state was maintained for a predetermined time period, then the apparatuses will enjoy the same effects as in the fourth embodiment.

In the fourth embodiment, the approach distance can be set arbitrarily by the modulator on operation panel 9. The present invention, however, is not limited thereto. It is possible, for example, to preset the approach distance as a function of the measured distances.

It is possible also in the fourth embodiment to cause, instead of the alarm lamp, the numeric value "0" indicated at approach distance display portion 15 to flash on and off, as in the first embodiment. Furthermore, it may be configured such that alarm 10 activated in step Q7 automatically stops after a prescribed time of operation, as in the first embodiment, independently of the release of input device 11 in step Q8. In this case, it may also be configured such that the processing in step Q9 is automatically executed to clear the system and the control is returned to the starting point.

Moreover, in the fourth embodiment, input device 11 is provided in the vicinity of the driver's seat. The present invention, however, is not limited thereto. For example, if input device 11 is provided as a remote controller that can send a signal to a controller (not shown) containing microcomputer 2 therein, it is possible to place the input device 11 at any arbitrary position allowing easy manipulation by the driver.

The following distance alarming apparatus and the following distance displaying apparatus of the present invention are applicable not only to the rear-end collision alarming apparatus, the collision predicting apparatus or the following distance informing apparatus described above, but also to the combination thereof, for example. Various modifications thereof are also possible. For example, in the second embodiment, setting and storing of the reference range for the output signal value and displaying of the alarm distance, approach distance, zone portion 17 and pointer 18 in step T3 have been performed when the follow-up travel state was maintained for a prescribed time period (steps T2, T11). It should be apparent, however, that these steps T2 and T11 can be changed such that the subsequent steps T3 and T12 are performed when the output signal values from sensor 4 remained unchanged for a prescribed time period, as described in the first embodiment.

In the first and second embodiments, the reference range for the output signal value has been set and stored based on the output signal value from sensor 4 at the time when the output signal values from sensor 4 remained unchanged for a prescribed time period, or at the time when the subject vehicle and the preceding vehicle maintained the follow-up travel state for a prescribed time period. The present invention, however, is not limited thereto. For example, the output signal value itself from sensor 4 at that time may be stored as the reference value. In this case, it should be easy for a person skilled in the art to appropriately modify the decision contents of step S6 in FIG. 4 and steps T4, T8 in FIG. 5.

In the embodiments described above, generally, the numeric values displayed at following distance display portion 13 and approach distance display portion 15 decrease according to the decrease of the following distance between the subject vehicle and the preceding vehicle. These numeric values displayed increase as the distance between the two vehicles increases. The present invention, however, is not limited thereto. For example, it may be configured such that the system in operation is automatically cleared (cancelled) when the following distance increases beyond a preset distance. More specifically, in the second embodiment, if a distance at which the system flow is cleared (cancelled) is set to 27 meters corresponding to the following distance of 22 meters at the time when the follow-up travel state was maintained for a prescribed time period, then the system flow can be cleared when the distance between the subject vehicle and the preceding vehicle reaches 27 meters, to return to the starting point.

The displaying apparatus of the present invention, likewise, is applicable nonexclusively to the following distance alarming apparatus described above. For example, it may also be applicable to a known following distance alarming apparatus that causes alarm 10 to activate when it is detected that the following distance between the subject vehicle and the preceding vehicle has decreased to a safety following distance predetermined according to the speed of the subject vehicle. In this case, it may be configured such that the safety following distance predetermined according to the speed of the subject vehicle, i.e., the alarm distance at which alarm 10 activates, and the approach distance indicated by the difference between the following distance to the preceding vehicle and the alarm distance are displayed when the subject vehicle and the preceding vehicle maintained the follow-up travel state for a prescribed time period.

Various modifications are conceivable for the numeric value displayed at approach distance display portion 15. For example, the numeric value initially displayed may be differentiated from the subsequently displayed values, by highlighting it with a different color or with character inversion. Any displaying manner can be adapted, as long as it makes the numeric value perceivable as an aid to maintain a good and safe distance from the preceding vehicle.

Furthermore, it is possible to configure the apparatuses of the respective embodiments to operate only when prescribed conditions are satisfied. For example, the apparatuses may be configured to operate exclusively when the speed of the subject vehicle is greater than a predetermined speed, or when the output signal value from sensor 4 exceeds a predetermined value. Moreover, in place of or in addition to these modifications, it is possible to configure such that the respective apparatus in operation stops the operation when other prescribed conditions are satisfied. For example, it may be configured such that the processing is cancelled when the apparatus in operation has continuously received a signal from brake sensor 6 for a fixed time period or when the following distance was not measured in a fixed time period. It is noted that, although such a modification may increase complexity of the processing or costs of the apparatus, remarkable effects can be expected from the standpoint of preventing traffic accidents.

In this case, it will be more effective if the driver is informed of the reason why the processing was cancelled or why alarm 10 failed to operate. To this end, it is possible, for example, to provide an indicator lamp on liquid crystal display 12. As a displaying manner, when the processing was cancelled by the signal from brake sensor 6, for example, a mark symbolizing the brake may be displayed on liquid crystal display 12 for a fixed time period.

In the first and second embodiments, sensor 4 was a throttle valve opening sensor. The present invention, however, is not limited thereto. For example, sensor 4 may be an air flow meter provided in an intake manifold for detecting the volume of air sucked into an engine, a vacuum sensor detecting a pressure of an intake manifold, an engine speed sensor detecting an engine speed, a touch sensor attached to accelerator pedal 3, or any other sensor having its signal output amount changing in accordance with manipulation of accelerator pedal 3. Alternatively, a sensor detecting a battery voltage changing in accordance with the manipulation of accelerator pedal 3 may be used as sensor 4.

As explained above, according to the present invention, operative conditions of the following distance alarming apparatus are changed, after the subject vehicle and the preceding vehicle maintained the follow-up travel state for a prescribed time period, or after the measured distance to the preceding vehicle remained unchanged for a prescribed time period, every time a newly established follow-up travel state is detected, or every time it is detected that the output signal values from sensor 4 remained unchanged for a prescribed time period, based on a distance predetermined corresponding to the following distance measured at that time and the output signal value from sensor 4. As a result, an automobile collision preventing apparatus allowing accurate response to travelling conditions can be provided.

In the displaying apparatus, if the output signal values from sensor 4 have remained unchanged for a prescribed time period, or the subject vehicle and the preceding vehicle have maintained the follow-up travel state for a prescribed time period, or if the driver operates the input device, the alarm distance at which alarm 10 activates, being preset corresponding to the following distance measured at that time or the speed of the subject vehicle at that time, and the approach distance, being the difference between the following distance subsequently measured and the alarm distance, are displayed. This allows the driver to readily perceive how many more meters are left before the following distance reaches the distance at which alarm 10 activates. In addition, when pointer 18 indicating the change of the output signal value from sensor 4 comes out of the range of zone portion 17 of scale 16, the displaying manner of each display light such as pointer 18 or zone portion 17 is changed to facilitate visual recognition as to whether the conditions required for determination of likelihood of rear-end collision are being satisfied. These display functions allow the driver to recognize, at a glance, how the following distance alarming apparatus is operating with respect to the preceding vehicle. Accordingly, the present invention serves as a guide to safe travelling to prevent careless rear-end collision accidents or the like, thereby contributing to traffic safety.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A following distance alarming apparatus connected to receive output signals of a following distance measuring device and a sensor having an output signal value that changes in accordance with operation of a speed control device of a subject vehicle, comprising:

a memory configured to respond to the output signal value from said sensor having remained unchanged for a prescribed time period, for storing a reference value for the output signal value based on the output signal value from said sensor; and a first alarming circuit configured to determine a possibility of collision of the subject vehicle with a preceding vehicle based on a following distance measured by said following distance measuring device when the output signal value from said sensor remains unchanged for the prescribed time period, the output signal value from said sensor and said reference value stored in said memory, to output a warning sound.

2. The following distance alarming apparatus according to claim 1, wherein said first alarming circuit includes means for determining an alarm generating distance based on the following distance output from said following distance measuring device when the output signal value from said sensor remained unchanged for the prescribed time period, and a determining circuit configured to respond to said following distance measuring device having measured said alarm generating distance, and to determine the possibility of collision by examining whether the output signal value from said sensor satisfies a prescribed relation with said reference value.

3. The following distance alarming apparatus according to claim 2, wherein said reference value stored in said memory is for determining a predetermined range, and said determining circuit includes a circuit configured to respond to said following distance measuring device having measured said alarm generating distance, and to determine the possibility of collision based on whether the output signal value from said sensor is within said predetermined range or not.

4. The following distance alarming apparatus according to claim 3, further comprising a circuit, responsive to said determining circuit having determined that there is no possibility of collision, for resetting an operation of said following distance alarming apparatus.

5. The following distance alarming apparatus according to claim 2, further comprising:

a means for detecting, after the output value of said sensor remained unchanged for the prescribed time period, that the output value of said sensor again remains unchanged for a prescribed time period, and for causing a reference value determined based upon the output of said sensor at that time to be stored on the memory, and a second alarming circuit configured to respond to said following distance measuring device having measured the alarm distance determined corresponding to the following distance at the time of said output value of said sensor remaining for the prescribed time period, for determining the possibility of collision of the subject vehicle with the preceding vehicle based on the output signal value from said sensor and said reference value stored in said memory, to output the alarm.

6. The following distance alarming apparatus according to claim 1, further comprising a means for detecting, after the output value of said sensor remained unchanged for the prescribed time period, that the output value of said sensor again remains unchanged for a prescribed time period, and for causing a reference value determined based upon the output of said sensor at that time to be stored on the memory, and a second alarming circuit configured to respond to said following distance measuring device having measured the alarm distance determined corresponding to the following distance at the time of said output value of said sensor remaining for the prescribed time period, for determining the possibility of collision of the subject vehicle with the preceding vehicle based on the output signal value from said sensor and said reference value stored in said memory, to output the alarm.

7. A following distance alarming apparatus, comprising:

an alarm unit outputting a warning sound, based on a following distance measurement signal, when a following distance from a subject vehicle to a preceding vehicle decreases to a prescribed value;

a detecting unit detecting that an output signal from a sensor having an output signal value changing in accordance with operation of a speed of the subject vehicle has remained unchanged for a prescribed time period; and a display unit for displaying the following distance at which said alarm unit activates based on the fact that said detecting unit has detected that the output signal from said sensor had remained unchanged for the prescribed time period.

8. The following distance alarming apparatus according to claim 7, further comprising:

a memory connected to said sensor and storing a reference value determined in accordance with the output signal value of said sensor; and a display control circuit configured to respond to the output signal value of said sensor having failed to satisfy a prescribed relation with the reference value stored in said memory, for extinguishing and/or changing display on said display unit in a predetermined manner.

9. The following distance alarming apparatus according to claim 8, wherein said display control circuit extinguishes and/or changes the display on said display unit in the predetermined manner in response to a state where the output signal value of said sensor fails to satisfy the prescribed relation with the reference value stored in said memory having continued for a prescribed time period.

10. The following distance alarming apparatus according to claim 7, wherein the following distance at which said alarm unit activates is predetermined corresponding to the following distance measured when the output signal value of said sensor remained unchanged for the prescribed time period.

11. The following distance alarming apparatus according to claim 7, wherein the following distance at which said alarm unit activates is predetermined corresponding to the speed of the subject vehicle measured when the output signal value of said sensor remained unchanged for the prescribed time period.

12. A following distance alarming apparatus, comprising:

an alarm unit outputting a warning sound, based on a following distance measurement signal, when a following distance from a subject vehicle to a preceding vehicle decreases to a prescribed value;

a detecting unit detecting that a value of said following distance measurement signal has remained unchanged for a prescribed time period; and a display unit for displaying the following distance at which said alarm unit activates based on the fact that said detecting unit has detected that the value of said following distance measurement signal had remained unchanged for the prescribed time period;

a memory connected to a sensor having an output signal value that changes in accordance with operation of a speed control device of the subject vehicle, for storing a reference value determined in accordance with the output signal value of said sensor; and a display control circuit configured to respond to the output signal value of said sensor having failed to satisfy a prescribed relation with the reference value stored in said memory, for extinguishing and/or changing display on said display unit in a predetermined manner.

13. The following distance alarming apparatus according to claim 12, wherein said display control circuit extinguishes and/or changes the display on said display unit in the predetermined manner in response to a state where the output signal value of said sensor fails to satisfy the prescribed relation with the reference value stored in said memory having continued for a prescribed time period.

14. The following distance alarming apparatus according to claim 12, wherein the following distance at which said alarm unit activates is predetermined corresponding to the following distance measured when the value of said following distance measurement signal has remained unchanged for a prescribed time period.

15. The following distance alarming apparatus according to claim 12, wherein the following distance at which said alarm unit activates is predetermined corresponding to the speed of the subject vehicle measured when the value of said following distance measurement signal has remained unchanged for a prescribed time period.

16. A following distance alarming apparatus, comprising:

an alarm unit outputting a warning sound, based on a following distance measurement signal, when a following distance from a subject vehicle to a preceding vehicle decreases to a prescribed value;

a detecting unit detecting that an output signal from a sensor having an output signal value changing in accordance with operation of a speed control device of the subject vehicle has remained unchanged for a prescribed time period; and a display unit for displaying a difference between the following distance obtained from said following distance measurement signal and the following distance at which said alarm unit activates based on the fact that said detecting unit has detected that the output signal of said sensor had remained unchanged for the prescribed time period.

17. The following distance alarming apparatus according to claim 14, further comprising:

a memory connected to said sensor, and storing a reference value determined in accordance with the output signal value of said sensor; and a display control configured to respond to the output signal value of said sensor having failed to satisfy a prescribed relation with the reference value stored in said memory, for extinguishing and/or changing display on said display unit in a predetermined manner.

18. The following distance alarming apparatus according to claim 17, wherein said display control circuit extinguishes and/or changes the display on said display unit in the predetermined manner in response to a state where the output signal value of said sensor fails to satisfy the prescribed relation with the reference value stored in said memory having continued for a prescribed time period.

19. The following distance alarming apparatus according to claim 16, wherein the following distance at which said alarm unit activates is predetermined corresponding to the following distance measured when the output signal value of said sensor remained unchanged for a prescribed time period.

20. The following distance alarming apparatus according to claim 16, wherein the following distance at which said alarm unit activates is predetermined corresponding to the speed of the subject vehicle measured when the output signal value of said sensor remained unchanged for a prescribed time period.

21. A following distance alarming apparatus, comprising:

an alarm unit outputting a warning sound, based on a following distance measurement signal, when a following distance from a subject vehicle to a preceding vehicle decreases to a prescribed value;

a detecting unit detecting that a value of said following distance measurement signal has remained unchanged for a prescribed time period; and a display unit for displaying a difference between the following distance obtained from said following distance measurement signal and the following distance at which said alarm unit activates based on the fact that said detecting unit has detected that the value of said following distance measurement signal had remained unchanged for the prescribed time period.

22. The following distance alarming apparatus according to claim 21, further comprising:

a memory connected to a sensor having an output signal value that changes in accordance with operation of a speed control device of the subject vehicle, and storing a reference value determined in accordance with the output signal value of said senor; and a display control circuit configured to respond to the output signal value of said sensor having failed to satisfy a prescribed relation with the reference value stored in said memory, and to extinguish and/or change display on said display unit in a predetermined manner.

23. The following distance alarming apparatus according to claim 22, wherein said display control circuit extinguishes and/or changes the display on said display unit in the predetermined manner in response to a state where the output signal value of said sensor fails to satisfy the prescribed relation with the reference value stored in said memory having continued for a prescribed time period.

24. The following distance alarming apparatus according to claim 21, wherein the following distance at which said alarm unit activates is predetermined corresponding to the following distance measured when the value of said following distance measurement signal has remained unchanged for a prescribed time period.

25. The following distance alarming apparatus according to claim 21, wherein the following distance at which said alarm unit activates is predetermined corresponding to the speed of the subject vehicle measured when the value of said following distance measurement signal has remained unchanged for a prescribed time period.

26. A following distance alarming apparatus, comprising:

an alarm unit outputting a warning sound, based on a following distance measurement signal, when a following distance from a subject vehicle to a preceding vehicle decreases to a prescribed value;

a detecting unit detecting that an output signal from a sensor having an output signal value changing in accordance with operation of a speed of the subject vehicle has remained unchanged for a prescribed time period; and an input device provided to the subject vehicle; and a display unit displaying a difference between a following distance obtained from said following distance measurement signal and the following distance at which said alarm unit activates based on an input signal from said input device, the input signal changing in accordance with a speed control device of the subject vehicle.

27. The following distance alarming apparatus according to claim 26, wherein the distance at which said alarm unit activates is preset with respect to the following distance measured upon receiving the input signal from said input device.

28. The following distance alarming apparatus according to claim 26, wherein the distance at which said alarm unit activates is preset with respect to a speed of the subject vehicle measured upon receiving the input signal from said input device.

* * * * *